United States Patent [19]
Erlich et al.

[11] 3,721,268
[45] March 20, 1973

[54] MULTIPORT VALVE WITH ROTATABLE COVER

[76] Inventors: Giora Erlich, 220 West Jersey Street, Elizabeth, N.J. 07202; Marc Lerner, Swan Lake, N.Y. 12783

[22] Filed: Dec. 3, 1970

[21] Appl. No.: 94,727

[52] U.S. Cl. ............................................. 137/625.46
[51] Int. Cl. ............................................... F16k 11/06
[58] Field of Search ........ 137/625.46, 625.48, 625.41

[56] References Cited

UNITED STATES PATENTS

| | | | |
|---|---|---|---|
| 3,114,393 | 12/1963 | Vlasic | 137/625.46 X |
| 679,387 | 7/1901 | Mathieu | 137/625.46 X |
| 1,999,808 | 4/1935 | Goodman | 137/625.46 |
| 2,893,430 | 7/1959 | Holl | 137/625.46 X |
| 3,096,787 | 7/1963 | Kayler | 137/625.46 X |
| 3,422,848 | 1/1969 | Liebman et al. | 137/625.46 X |
| 3,472,484 | 10/1969 | Parker | 137/625.41 X |
| 3,488,032 | 1/1970 | Scott | 137/625.46 X |

*Primary Examiner*—Samuel Scott
*Attorney*—Lawrence S. Lawrence

[57] ABSTRACT

A multiport valve is provided having a valve body and a manually rotatable cover mounted on the body for selectively directing fluid flow among a plurality of influent and effluent lines. A valve seat comprising a unitary resilient seal ring is disposed between the rotatable cover and the valve body to prevent internal and external leakage therebetween during rotation of the valve cover and in the selected position.

13 Claims, 6 Drawing Figures

MULTIPORT VALVE WITH ROTATABLE COVER

Multiport valves permit fluid from one or more influent lines to be directed to one or more preselected effluent lines. These valves perform the function of a switch to conduct or transfer flow from one line to another line, mix the flow from several sources and then conduct it to a preselected line, or simply stop the flow. Because they are capable of several functions, multiport valves are widely used for fluid transporting systems in such areas as the chemical process industry, water treatment facilities, and swimming pool water circulation system.

Many multiport valves comprise a lower housing portion or body having connecting means for both the influent and effluent lines, and internal flow passages for conducting the flow within the valve to the valve seat, an upper housing portion or cover connected to the lower housing portion at a position adjacent to the valve seat, and a valve rotor disposed within the upper housing portion to seal against the valve seat and selectively direct the flow from an influent line to an effluent line. The rotor is usually a disc having openings which correspond to influent and effluent lines and which can be selectively aligned to match the desired flow passages in the lower housing portion. The position of the rotor upon the seat above the flow passages in the lower housing portion determines the direction that the flow will take.

The rotor is movably disposed within the upper housing portion so that it may be lifted from the valve seat and rotated to the desired position. An external lever mechanically linked to the rotor by means extending through the upper portion of the valve housing is usually provided for this purpose. The seat is usually a rubber gasket which is disposed between the rotor and the lower housing portion. The gasket can be in the form of a flat continuous sheet having a plurality of apertures therein which correspond to the flow passages in the lower housing portion as utilized in the multiport valve of U.S. Pat. No. 2,857,929 to Whitlock, Jr., or there can be individual gaskets which surround each flow passage, such as shown in U.S. Pat. No. 2,633,325 to Whitlock, Jr. A spring is provided to bias the rotor against the rubber gasket, thus sealing the valve in the selected position.

Multiport valves of this type have several deficiencies which have adverse effects upon their operation and upon the operation of the fluid system in which they are utilized. In this valves, a separate fluid seal is required between the valve body and the cover, and between the rotor and the valve body. Each seal represents a potential leakage path. In addition, the valve rotor is often susceptible to cocking in the valve body, thus further increasing the likelihood of internal leakage. This is particularly undesirable since such leakage is not readily detectable.

The fluid entering the valve also exerts a force upon the rotor which tends to lift it from the seat. The magnitude of this lifting force is proportional to the differential pressure across the rotor. Only the force of the spring maintains the rotor in its sealing position upon the valve seat. Therefore, as the flow rate increases, there is a tendency for leakage to occur across the rotor and be discharged through unselected ports. This can be serious problem where a flat gasket not capable of being greatly compressed is utilized between the rotor and the lower housing portion, inasmuch as slight lifting of the rotor could release the compression upon the gasket and break the seal. In addition to lifting the rotor from the seat, if the influent flow passes through an opening in the rotor which is off-center, as shown in U.S. Pat. No 2,633,325 to Whitlock, Jr., a torque can be exerted upon the rotor which tends to twist it within the upper housing portion. The combined effect of the torque and the lifting of the rotor increases the probability of leakage.

In accordance with the present invention an improved multiport valve is provided which substantially eliminates the problems and deficiencies found in existing multiport valves. In the multiport valve of the instant invention the valve cover is manually rotatable and serves the dual purpose of closing the valve body to prevent external leakage, and connecting the desired fluid lines as a rotor in prior valves. In this manner a unitary seal between the cover and the valve body prevents both internal and external leakage. Thus the construction of the valve is greatly simplifed by combining the cover and rotor in a single unit and the number of leakage paths minimized.

The multiport valve of the invention comprises a valve body having at least one high pressure inlet port, a plurality of low pressure inlet and outlet ports, and an array of individual flow chambers in fluid communication with the ports; a manually operable valve cover having a plurality of flow passages formed therein and disposed on the valve body in close juxtaposition to the array of flow chambers, for rotational and axial movement thereon, to selectively communicate the high pressure inlet port with at least one flow chamber leading to a low pressure port, and to selectively interconnect at least two flow chambers for flow between two low pressure ports; and a resilient unitary seal ring for sealing the cover during rotation and in a selected position, disposed as a valve seat between the cover and the valve body and surrounding each flow chamber in the array to prevent internal and external leakage. A central support post fixed to the valve body can be provided to secure the cover in place. The valve cover has a corresponding bore therethrough which sealably engages the central post to prevent external leakage of fluid. A locking means disposed on the exterior of the cover movably engages the central support post and is operative to permit axial movement and rotation of the cover, and to lock the cover in a selected position.

The construction of the multiport valve disclosed herein cures several dificiencies found in prior multiport valves. The rotatable cover greatly reduces the complexity of the valve by eliminating the need for an internal rotor and the necessary mechanical linkage to effectuate its movement to the desired position. Also, rather than requiring individual sealing means to prevent internal and external leakage, the unitary seal ring serves both purposes and thus reduces the number of potential leakage paths.

The internal pressure within the valve biases the cover axially toward a non-seated position and this biasing force is utilized to axially lift the cover to permit rotation to a desired position. However, the locking means is adapted to firmly secure the cover in a selected position against the seat and prevent undesired lifting or cocking during use.

Another advantage of the present multiport valve is the ease with which it may be serviced. Simply removing the cover provides access to the interior of the valve, in order to service the cover or replace the seal ring.

The flow chambers which communicate the fluid ports are located at one end of the valve body so that their entrances are in a single plane and the solid material surrounding each flow chamber thus forms the seat for the cover. The flow chambers can have any desired cross-sectional shape, such as circular or square. However, in order to provide maximum flow area for the fluid flowing therethrough, it is preferable that a central flow chamber be formed with a circular cross-section and the remaining flow chambers each have a cross-sectional shape in the form of a radial annular segment of a circle disposed around the central chamber so that the entire array of flow chambers forms two concentric circles. The seat portion of the valve body surrounding each flow chamber thus resembles a spoked wagon wheel, and the unitary seal ring has a corresponding shape to seal against the cover when it is seated thereagainst. It is convenient that the central flow chamber communicate the high pressure inlet port, since it is the fluid that enters via this port which is directed to one or more of the other flow chambers. This arrangement simplifies the flow passage arrangement in the cover and is therefore preferred. But it should be noted that one or more of the annular chambers could also be employed for high pressure inlet fluid, and in some arrangements the central flow chamber can be eliminated. Such arrangements will be apparent to those skilled in the art. In addition, the flow chambers should have a cross-sectional shape that corresponds to the shape of the passages in the cover at the seat and have a circular cross-section corresponding to the connecting pipes at the ports. In this manner a constant or a gradually reducing cross-sectional flow area from the flow passages in the cover to the connecting lines can be maintained, thus resulting in a low differential pressure across the valve.

All of the fluid line connecting ports can be of any convenient type suitable for the particular system, such as tapered hose connections or threaded or flanged ports. Similarly, the ports can be located in any desired position upon the valve.

The valve body can be formed by machining, forgoing, casting or extruding. However, the structure of the valve body renders it particularly well suited for manufacture by casting. It can thus be formed in the most compact manner having flow chambers of optimum size and shape designed to withstand maximum internal pressure and provide minimum differential pressure.

The valve body can be constructed from any material that has the tensile strength to withstand the operating pressures of the system in which the valve is to be utilized. Plastic materials suitable for injection or compression molding are preferred for several reasons. By utilizing plastic materials, the cost of casting the valve body is kept to a minimum, inasmuch as the material itself is inexpensive, and usually requires little labor time for casting or molding. In addition, many plastic materials are resistant to deterioration by fluids, such as chlorinated water, which is a necessity for a multiport valve used in a swimming poor water circulation system, for example. Many plastic materials are also lightweight compared to metal, and thus permit the valve to be assembled and installed with relative ease. Many plastic materials can be molded with smooth surfaces and therefore create a lower differential pressure than metal castings which usually have relatively rough surfaces. Moreover, when pipes are threadably attached to the valve body, the plastic material can usually be deformed to perform the function of a seal to prevent external leakage, thus requiring no additional sealing means, such as gaskets, O-rings or tape. In addition plastic valves are readily bonded to plastic pipes.

Plastics such as ABS polymer, Celcon (polycarbonate resin), Cellon (cellulose acetate), Delrin (polyoxymethylene), PVC, nylon and Teflon (polytetrafluoroethylene) are particularly well suited for the formation of the body valve. Transparent or translucent plastic materials such as polyethylene, polypropylene, polyvinylchloride, and Lexan (polycarbonate resin) can also be employed. In systems where it is desirable to observe the clarity of the fluid at any given time, the use of a transparent valve body is advantageous.

Metallic materials can also be utilized for the construction of the valve body where additional strength is required, although they are less desirable than plastic. Suitable corrosion resistant metals that can be cast into the desired shape include aluminum, bronze, stainless steel, brass, zinc and cadmium-plated and zinc-plated iron, nickel and chromium, and ceramic-coated metals.

The valve cover can have any suitable shape for enclosing pressure containing vessels, such as hemispherical. It is formed what at least one internal flow passage to conduct high pressure inlet fluid from the appropriate flow chambers in the valve body to the selected low pressure port. The cover is movably disposed on the valve body, so that it may be axially lifted from the valve seat and rotated to a position in which the flow passage is aligned with the inlet flow chamber in he valve body and the outlet flow chamber in the valve body corresponding to the desired outlet port. Such movement can be facilitated by providing a cylindrical skirt on the cover to slidably engage a corresponding cylindrical portion formed on the exterior of the valve body to form a piston-cylinder arrangement. The skirt on the cover should be sufficiently long so that it maintains engagement with the valve body in the lifted position. The prevents cocking of the cover during rotation, and also provides a convenient seal surface for the peripheral sealing characteristics of the unitary seal ring as will be explained hereinafter. The central support post also guides the cover during axial and rotational movement. Preferably the internal pressure provides sufficient force to lift the cover to permit rotation when the locking means is released. However additional biasing means, such as a spring, can also be employed, and is often desirable where movement of the cover is anticipated when there is no internal pressure. In order to ensure proper alignment of the cover upon the seat to avoid leakage and prevent excessive pressure drop, the cross-sectional shape of the flow passage in the valve cover should be the same as the cross-sectional shape of the corresponding flow chambers in the valve body. The seating surface of the cover adjacent the valve seat is smooth to provide a sealing surface for the seal ring in each selected position of the cover, and can be either flat or contoured. A contoured surface can be adapted to provide thin line sealing with the seal ring, which is preferable in high pressure systems.

To facilitate manual rotation of the valve cover from one position to another, ribs on the exterior surface can be provided to serve as gripping means. The ribs also increase the strength of the cover. In addition indexing lugs or similar means can be provided to assure proper alignment of the cover in the selected position.

The versatility of the multiport valve is greatly increase by providing a flow passage in the cover to interconnect two additional flow chambers in the valve body. In this manner, high pressure fluid can be directed from the inlet port via the first flow passage in the cover to a selected first low pressure port from where it can flow to another component in the system, such as a filter. The effluent flow from the filter can then reenter the multiport valve through a second low pressure port and be directed to a third low pressure port by the second flow passage formed within the cover. The direction of the flow within the filter can be reversed by moving the valve cover to a position in which the high pressure inlet flow is directed to the second low pressure port, which had previously been receiving effluent flow from the filter. In this position of the cover, the reverse flow filter effluent can be returned to the valve via the first low pressure port and can be directed to a fourth low pressure port by the second flow passage in the cover. This is particularly useful for cleaning a filter by backwashing; a process wherein fluid is passed in the reverse direction through a filter to remove the contaminants that have been entrapped thereby. The multiport valve can return the clean filter effluent to the system via the third low pressure port, in one position of the cover and can discharge the backwash effluent to a waste line via the fourth low pressure port in another position of the cover. In additional positions of the cover the system fluid can be discharged directly to the waste line or returned to the system without passing through the filter. The use of additional ports, flow passages and positions of the cover for other fluid systems will be apparent to those skilled in the art.

The cover can be formed from the same material as the valve body. Plastic such as Celcon (polycarbonate resin) is particularly well adapted for this purpose, since it possesses high abrasion resistance for durability of the seal surface and has a low coefficient of friction for ease of rotation.

The unitary seal ring which provides a leakproof seal between the valve cover and the valve body is a feature of this invention which greatly improves the operating efficiency of the multiport valve. A continuous lip surrounding each flow chamber at the valve seat is formed in the valve body. The lip can be formed in an insert which engages a step in the valve body, but for lower cost and higher reliability a lip formed directly in the valve body as a vertical extension of the walls separating the flow chambers is preferred. The unitary seal ring has an inverted U cross-section and is formed with a continuous groove defined by the U corresponding in shape to the continuous lip surrounding the flow chambers, and adapted to mate therewith in a leakproof manner to provide a seal between the cover and the valve body in every position of the cover. The seal ring can be bonded in place to prevent it disengagement from the valve body when the valve cover is lifted for rotation. Flexible adhesives are preferred for this purpose, since they permit removal of the ring for replacement. The inverted U configuration of the seal ring provides greater seating surface area for the cover than the seating surface in the valve body, and also provides a larger area for sealing against and bonding to the valve body than a conventional gasket. This minimizes the cost and complexity of the valve body, since it can be reduced in size and need not be provided with the grooves or recesses for receiving seating gaskets.

The seal ring is a molded one piece gasket of a resilient material and can be formed with a continuous peripheral lip disposed along the outer edge of the ring and adapted to sealably engage the inner surface of the cylindrical skirt on the valve cover to prevent external leakage when the cover is axially lifted from the seat for rotational movement. The lip is preferably in the form of a flange extending outwardly and upwardly at an angle of about 100 to 170 degrees with respect to the ring seating surface. The flange can have any shape cross-section such as rectangular, circular or others. The internal pressure within the valve assists in sealing the peripheral lip by biasing it into a sealing position against the skirt. The friction created between the peripheral lip and the skirt does not however hinder axial or rotational movement of the cover. Also, if the valve is not rotated for a long period and the rubber gasket tends to adhere to the cover, the axial movement of the cover will break this undesired bond and permit free turning of the cover. In the locked seated position the seating surface of the unitary seal ring prevents both internal and external leakage between the cover and the valve body and cuts off the pressure acting on the peripheral lip. Accordingly, in non-critical fluid systems, such as swimming water pool circulation systems, where slight sporadic leakage can be tolerated an absolute leakproof seal between the peripheral lip and the skirt is not required, since such leakage will cease when the cover is in a seated position, and rotating the cover to a new position takes only a few seconds. This permits the peripheral lip and the skirt to be formed with relatively loose tolerances, thus further reducing the cost of the valve. Of course where leakage cannot be tolerated it can be absoluted prevented by forming the mating parts with close tolerances.

It is desirable that an abrasion resistant material be utilized for the seal ring to ensure long life, and yet be able to obtain a fluid tight seal between the cover and the seating surface. Any resilient elastomer having a durometer as high as approximately 90 and high abrasion and erosion resistant properties and capable of being molded into the desired shapes can be utilized. High durometer neoprene and polyurethane resin have been found to be particularly suitable. In this manner, the passage of sand and other hard particles across the seal ring surface when the valve is lifted for rotation to another position, which is common in swimming pool circulation systems, will usually not cause damage to the sealing surface that could result in leakage.

The central support post can be formed as an integral part of the valve body or can be a separate component installed therein as in the case of a tie rod commonly utilized in fluid pressure vessels to secure a cover or cap thereon. The post extends to the exterior of the cover through a bore formed therein. An O-ring or other gasket can be disposed between the post and the bore in the cover to prevent external leakage.

The locking means is attached to the exteriorly extending portion of the post, engages the top exterior surface of the cover, and is movable between locked and unlocked positions, securing the cover against the seal ring in the locked position and permitting the internal pressure or other lifting means to axially lift the cover off the seal ring to facilitate manual rotation to another valve position in the unlocked position.

The locking meaning can be simply an internally threaded knob adapted to engage a corresponding threaded portion on the exterior of the central post. The knob can also be formed as a part of the central post and the central post can be adapted to threadably engage the valve body. In either case the threads must be sufficiently long so that they do not become disengaged in the unlocked position.

The locking means can also be a lever pivotally mounted on a sleeve slidably disposed on the central post. The lever is formed with a contoured cam end which bears against the top surface of the cover in the locked position to secure it in place. In addition, by keying the lever handle to the cover in the unlocked position, the handle may also be used to rotate the cover to a desired position. Other locking means will be apparent to those skilled in the art.

The multiport valve of this invention is particularly well suited for efficient control of fluid flow direction in swimming pool circulation systems, due to its lightweight, corrosion resistant construction, the unitary seal ring, and the easily rotatable valve cover. It should be noted, however, that the multiport valve is by no means limited to use only in swimming pool circulation systems and can be efficiently employed in any fluid system.

The construction and operation of the multiport valve of this invention are further explained by reference to the drawings in which.

Figure 2:
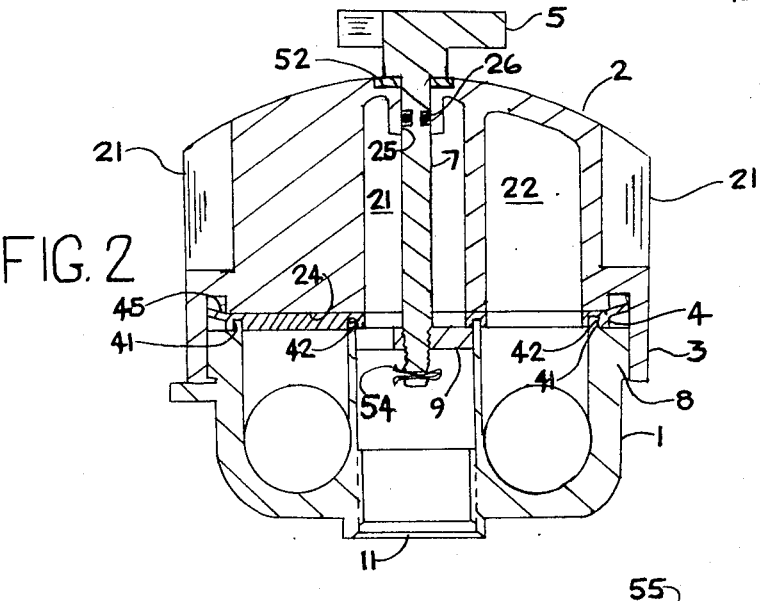
FIG. 2 is a cross-sectional view of the multiport valve taken along the line 2—2 of FIG. 1 and looking in the direction of the arrows.
Figure 5:
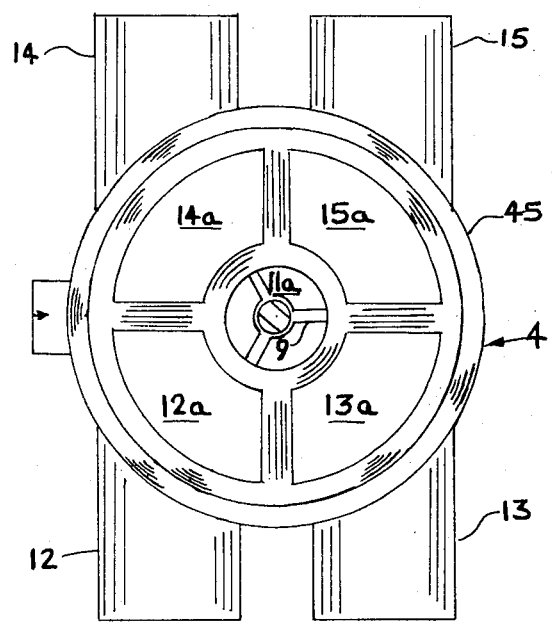
FIG. 5 is a top view of the valve body with the cover removed showing the flow chambers and the unitary seal ring.

The multiport valve shown in the drawings is primarily designed for use in a swimming pool circulation system and comprises an injection molded valve body 1 formed of plastic material material and having a high pressure inlet port 11 and four low pressure inlet and outlet ports 12, 13, 14, and 15. As shown in FIG. 2 a manually operable valve cover 2 encloses the valve body 1 and is disposed thereon for rotational and axial movement to selectively direct fluid entering via inlet 11 to at least one low pressure outlet port and to selectively interconnect at least two low pressure ports. The valve cover 2 is also formed of injection molded plastic material. A knob 5 formed as an integral port of a central post 7 is operative to lock cover 2 in a selected position and to permit the cover 2 to axially lift to allow manual selection of the desired valve position. Ribs 21 are provided on the valve cover 2 to facilitate manual rotation of the cover to the desired position. A unitary seal ring 4 of high durometer neoprene is disposed on the valve body 1 to provide a seat for the cover 2 to prevent internal and external leakage in each valve position and during rotation of the cover. The high pressure port 11 is disposed in the center of valve body 1 and communicates with the cover 2 via flow chamber 11a. The low pressure ports 12, 13, 14, and 15 are formed in the valve body 1 as tubular members and communicate with annular flow chambers 12a, 13a, 14a and 15a, as shown in FIG. 5. The pressure of the fluid entering through inlet port 11 provides an upward axial force upon the cover 2, which biases the cover away from a sealing position against the seal ring 4 to facilitate rotation to another valve position when the knob 5 is loosened.

Figure 1:
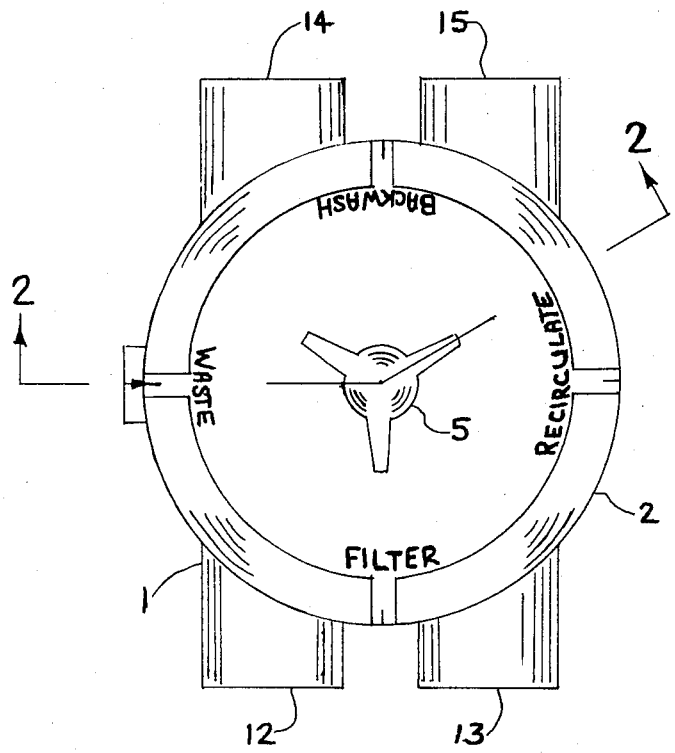
FIG. 1 is a top plan view of the multiport valve showing a threaded knob locking means for securing the cover in the selected rotary position.

Flow chambers 12a, 13a, 14a and 15a each correspond to a position of the cover shown in FIG. 1. A flow passage 21 in the cover 2 communicates flow chamber 11a and has substantially the same cross-sectional shape as the flow chambers 12a, 13a, 14a and 15a. Therefore, in any position of the valve the passage 21 will be aligned with a flow chamber in the valve body so that the flow from the inlet 11 will be conducted to the selected outlet port. A second flow passage 22 in the cover is adapted to provide selective interconnection between two other low pressure ports via their corresponding flow chambers. The purpose of this interconnection in a swimming pool water circulation system is explained hereinafter with reference to the schematic shown in FIG. 6. The cover 2 is guided on the valve body 1 by a cylindrical skirt 3 which slidably engages a corresponding cylindrical portion 8 of the valve body 1. The skirt 3 is sufficiently long so that it does not disengage the valve body when the cover is axially lifted for rotation. The central post 7 also provides guidance for the cover to prevent cocking during axial movement and rotation.

The unitary seal ring 4 as shown in FIGS. 2 and 5 is disposed on the valve body 1 surrounding each flow chamber. The seal ring 4 has a continuous groove 41, which engages the end of a corresponding continuous lip 42 formed in the valve body and forms a fluid tight seal therewith. When the locking force of knob 5 is applied to the top of the cover 2, a smooth sealing surface 24 formed on the under side of the cover, comes in contact with the seating surface 44 of the seal ring 4 to seal the cover in the selected position. A continuous peripheral lip in the form of a flange 45 is disposed along the outer edge of the ring 4 and is formed as an integral port thereof. The flange is at an angle of approximately 120° with respect to the seating surface 44 and is adapted to sealably engage the inner surface of the skirt 3 on the cover 2 to prevent external leakage when the cover is axially lifted from the seat fro rotational movement. By forming the seal ring 4 from a 55 durometer resilient chlorine-resistant rubber, such as neoprene, it is resistant to abrasion by the cover 2 and the flow of particulate material across the valve seat, which occurs when the cover is lifted from its seating position for rotational movement, as well as resistant to deterioration by chlorinated water.

Figure 3:
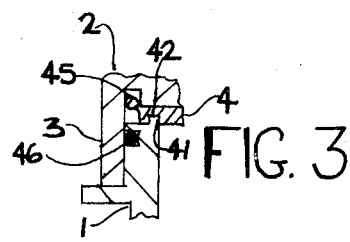
FIG. 3 is a partial cross-sectional view of the multiport valve showing the seal ring and an optional O-ring.

In FIG. 3 an optional O-ring 46 is shown disposed between the skirt 3 of the cover and the valve body 1. The o-ring provides a fail safe seal to absolutely prevent external leakage when the cover is lifted from the seat. This is useful in a critical system where even slight leakage cannot be tolerated. In addition, in this embodiment the peripheral lip on the seal ring has a circular cross-section and also serves as an O-ring.

The central post 7 threadedly engages a spider support 9 formed in the valve body. The post extends through a bore 25 formed in the cover 2 and is provided with an O-ring 26 therebetween to prevent external leakage. The knob 5 formed on protruding portion of the post 7 is manually movable between locked and unlocked positions. In the locked position as shown in FIG. 2 the knob is tighted against bearing washer 52 and thereby secures the cover in a seated position upon the seal ring 4. In the unlocked position the knob is loosened. Retaining pin 54 secured to the threaded end of post 7 prevents the post from being removed from the valve body. The internal pressure within the cover can then axially lift the cover off the seal ring 4 to permit manual rotation to another valve position.

Figure 4:
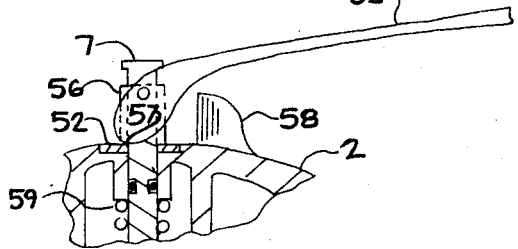
FIG. 4 is a partial cross-sectional view of the multiport valve showing a cam lock for the cover.

In FIG. 4 an alternative locking means is shown. A lever handle 55 is pivotally attached to a sleeve 56, which slidably rides upon the exterior portion of post 7. The lever 55 has a contoured end 57 which serves as a cam to engage the bearing washer 52 in the locked position and thereby hold the cover in a seated position. In the unlocked position the lever is downwardly disposed so that the cam and 57 disengages the bearing washer 52. This permits internal pressure to lift the cover for rotation to another position. In this embodiment a spring 59 is also provided to axially bias the cover into an unseated position. This enables the cover to be lifted and rotated when there is no internal pressure. A pair of upstanding flanges 58 (only one shown) are provided on the top surface of cover 2. In the unlocked position the handle 55 fits between and engages the flange 58. This permits the handle to be used as a means for rotating the cover.

Figure 6:
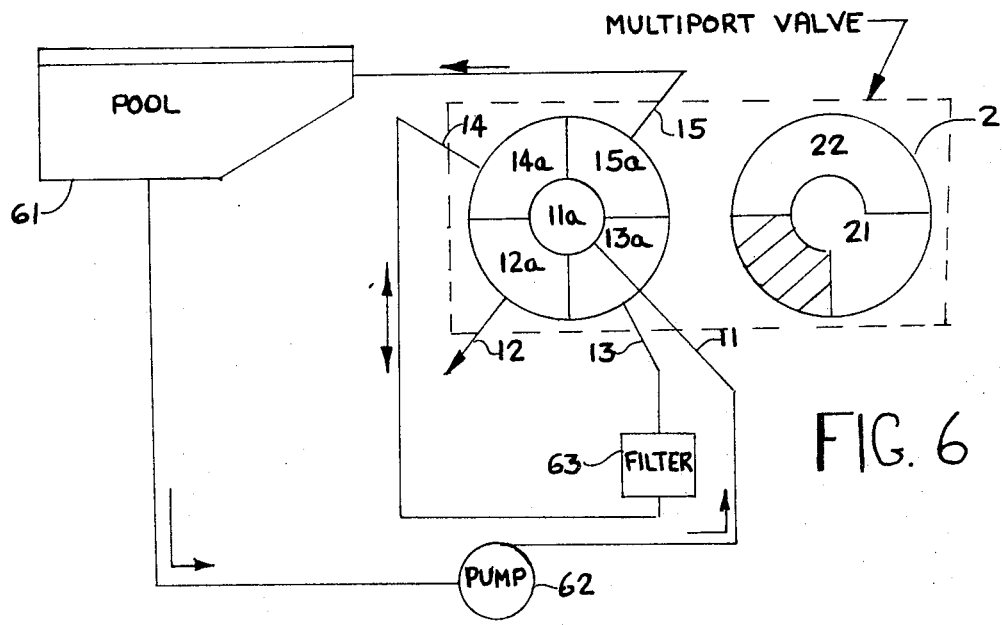
FIG. 6 is a flow schematic of a swimming pool circulation system.

In FIG. 6 a swimming pool 61 is shown schematically in fluid connection with a water circulation system which comprises a pump 62, the multiport valve of this invention and a filter 63. The filter 63 is a tank-type filter utilizing sand or diatomaceous earth as the filter medium. Under normal filtering conditions flow from the pool is fed to the top of the filter where it passes through the sand. The contaminants contained in the water are removed, and the clean effluent is returned to the swimming pool. When the filter becomes dirty after continuous use, it is necessary to backwash the filter bed in order to remove the contaminants that have been trapped therein. This is accomplished by feeding the water from the pool in the reverse direction through the filter tank. The water is fed from the bottom of the tank and as it passes through the bed, it carries away with it the contaminants that had previously been trapped by the filter. The backwash effluent containing the contaminants is then discharged via a waste line.

The multiport valve of this invention can be used to direct the flow in any direction through the filter or to discharge waste effluent simply by moving the cover 2 to the correct position. The multiport valve enclosed by the dotted line in FIG. 6, is shown in the filter position in which the indexing arrow shown in FIG. 1 would be pointing toward the position marked "filter" on the cover. In operation, water from the pool 61 is fed by pump 62 via inlet port 11 and flow chamber 11a through flow passage 21 in the cover 2 and into flow chamber 13a. The flow then proceeds via port 13 to the top of the filter tank 63. The filtered effluent passes from the bottom of filter tank 63 and is fed back to the multiport valve via port 14 and flow chambers 14a. The fluid then passes through flow passage 22 in the cover 2 and is conducted to flow passage 15a and port 15 from where it is returned to the swimming pool 61. In this manner flow passage 22 of the cover 2, is utilized to conduct flow between two low pressure ports in the valve.

When the filter 63 becomes clogged, the knob 5 is loosened, thus allowing the internal pressure to lift the cover 2 from the seal ring 4. The cover is then turned to the position marked "backwash," as shown in FIG. 1 and the knob 5 is tightened thus locking the cover 2 against the seat 4 in its new flow position. In the backwash position passage 21 of the cover 2 is aligned with flow passage 14a of the valve body. Flow proceeds from the swimming pool 61 via the pump 62 and inlet port 11 to the multiport valve. It then passes through passage 21 and 14a from where it is conducted to outlet port 14 which connects to the bottom of the filter 63. The flow then proceeds upwardly through the filter 63 to remove the contaminants that have been trapped therein and is returned to the valve via port 13. In this position of the valve passage 22 interconnects flow passages 13a, and 12a. Therefore, the fluid that enters the valve via port 13 will be conducted via passage 22 to flow chamber 12a and will be discharged to a waste line via outlet port 12.

At times, the filter must be serviced and for this purpose it may be necessary to disconnect it from the circulating system, or open it for viewing the filter bed. This can be accomplished without stopping the flow by moving the valve to the "recirculate" position. In this position, the fluid is conducted from inlet port 11 and flow chamber 11a via passage 21 and flow chamber 15a to port 15 from where it is returned directly to the pool without passing through the filter. Flow passage 22 in this position interconnects flow passages 12a and 13a, but since there is no flow in these lines, no fluid will pass therebetween.

The multiport valve of this invention also allows water to be discharged directly from the swimming pool to a waste line without passing through the filter. This is accomplished by selecting the "waste" position of the valve, so that the pool water is directed via flow chamber 12a to the waste line.

Having regard to the forgoing disclosure, the following is claimed as the inventive and patentable embodiments thereof. 1. A multiport valve for selectively directing fluid flow among a plurality of influent and effluent lines connected thereto, comprising a valve body having a plurality of fluid ports, and an array of corresponding individual flow chambers in fluid communication with the ports; a rotatable valve cover to enclose the valve body having at least one flow passage formed therein, said cover being axially movable between an unseated position, which facilitates rotational movement on the valve body in close juxtaposition to the array of flow chambers, to select at least two flow chambers for interconnection via the flow passage, and a seated position, in which the flow passage interconnects the selected flow chambers for flow between their corresponding ports; and a resilient unitary seal ring for sealing the cover in the selected position, disposed as a valve seat between the cover and the valve body and surrounding each flow chamber in the array to prevent internal and external leakage.

2. A multiport valve in accordance with claim 1, in which the valve body and the valve cover are molded from plastic material.

3. A multiport valve in accordance with claim 1, further comprising locking means movable between locked and unlocked positions disposed on the exterior of the cover to secure the cover in the seated position upon the seal ring to form a fluid-tight seal therewith in the locked position, and to permit the internal pressure to axially lift the cover from the seat to the unseated position to facilitate rotation of the cover to another valve position in the unlocked position.

4. A multiport valve in accordance with claim 3, in which a peripheral edge of the seal ring is adapted to sealably engage the valve cover to prevent external leakage in the unlocked position.

5. A multiport valve in accordance with claim 1, in which the valve body has a continuous upstanding lip surrounding each flow chamber; and the unitary seal ring has a corresponding continuous groove adapted to sealably engage the lip in the valve body.

6. A multiport valve in accordance with claim 5, in which the unitary seal ring is secured in place by a flexible adhesive.

7. A multiport valve in accordance with claim 5, in which the unitary seal ring is a molded one piece gasket of a resilient material having a seating surface which contacts and is compressed by the cover in its seated position, and a continuous peripheral lip extending from the outer edge which sealably engages the valve cover to prevent external leakage in the seated position.

8. A multiport valve in accordance with claim 7, in which the seal ring is formed from high durometer elastomer.

9. A multiport valve in accordance with claim 7, in which the peripheral lip of the unitary seal ring is a flange outwardly and upwardly extending at an angle of about 100° to about 170° with respect to the seating surface.

10. A multiport valve in accordance with claim 9, in which the flange has a substantially rectangular cross-section.

11. A multiport valve in accordance with claim 9, in which the flange has a substantially circular cross-section.

12. A multiport valve in accordance with claim 1, in which the cover is substantially hemispherical in shape and has a cylindrical skirt which engages a corresponding cylindrical portion of the valve body, to guide the cover during axial and rotational movements; and a peripheral edge of the seal ring is adapted to sealably engage the interior surface of the cylindrical skirt to prevent external leakage in the unseated position.

13. A multiport valve in accordance with claim 12, further comprising an O-ring disposed on the exterior of the valve body sealably engaging the cylindrical skirt.

* * * * *